(12) United States Patent
Guminy et al.

(10) Patent No.: US 8,893,118 B2
(45) Date of Patent: Nov. 18, 2014

(54) MIGRATABLE UNIT BASED APPLICATION MIGRATION

(75) Inventors: Scott M. Guminy, Newmarket (CA); Sanjeev Sharma, Scarborough (CA); Anthony L. Tjong, Scarborough (CA); David Yu Yuan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 2790 days.

(21) Appl. No.: 11/343,120

(22) Filed: Jan. 30, 2006

(65) Prior Publication Data

US 2007/0240143 A1    Oct. 11, 2007

(51) Int. Cl.
*G06F 9/45* (2006.01)
*G06F 9/44* (2006.01)

(52) U.S. Cl.
CPC ........................................ *G06F 8/70* (2013.01)
USPC ............ 717/175; 717/168; 717/169; 717/172; 717/173

(58) Field of Classification Search
CPC ........................................................ G06F 8/70
USPC .......... 717/172, 175, 177, 168, 137, 141, 121; 717/174, 204; 715/251; 713/100; 703/27; 719/310
See application file for complete search history.

(56) References Cited

U.S. PATENT DOCUMENTS

| | | | |
|---|---|---|---|
| 5,845,289 A * | 12/1998 | Baumeister et al. | 707/103 R |
| 6,341,271 B1 | 1/2002 | Salvo et al. | |
| 6,370,646 B1 * | 4/2002 | Goodman et al. | 713/100 |
| 6,574,635 B2 | 6/2003 | Stauber et al. | |
| 6,615,166 B1 * | 9/2003 | Guheen et al. | 703/27 |
| 6,744,450 B1 * | 6/2004 | Zimniewicz et al. | 715/841 |
| 6,892,382 B1 * | 5/2005 | Hapner et al. | 717/174 |
| 7,080,159 B2 * | 7/2006 | Chu et al. | 709/246 |
| 7,117,486 B2 * | 10/2006 | Wong et al. | 717/141 |
| 7,171,659 B2 * | 1/2007 | Becker et al. | 717/171 |
| 7,210,131 B2 * | 4/2007 | Schmidt et al. | 717/137 |
| 7,234,111 B2 * | 6/2007 | Chu et al. | 715/251 |
| 7,254,816 B2 * | 8/2007 | Rosenbloom et al. | 719/327 |
| 7,310,801 B2 * | 12/2007 | Burkhardt et al. | 717/169 |

(Continued)

FOREIGN PATENT DOCUMENTS

EP        0564845 A2    10/1993

OTHER PUBLICATIONS

Author; Alexander Keller, Gautam Kar Title: Dynamic Dependencies in Application Service Management Date: May 5, 2000. Publisher: IBM Research Devision p. 1-9.*

(Continued)

*Primary Examiner* — Thuy Dao
*Assistant Examiner* — Ziaul A Chowdhury
(74) *Attorney, Agent, or Firm* — Steven M. Greenberg, Esq.; CRGO Law

(57) ABSTRACT

Embodiments of the present invention address deficiencies of the art in respect to application migration and provide a novel and non-obvious method, system and computer program product for application migration through migratable units. In one embodiment, an application migration method can include decomposing an application migration into a plurality of migratable units (MUs). The MUs can be prioritized for migration to a target platform. Thereafter, each of the MUs can be migrated in an order defined by the prioritization. Finally, a stateful wizard can be provided which can reduce the complexity of the migration by providing a dashboard to the migration process.

20 Claims, 3 Drawing Sheets

(56) References Cited

U.S. PATENT DOCUMENTS

| | | | |
|---|---|---|---|
| 7,334,223 B2* | 2/2008 | Kumar et al. | 717/137 |
| 7,366,949 B2* | 4/2008 | Buskens et al. | 714/15 |
| 7,392,483 B2* | 6/2008 | Wong et al. | 715/746 |
| 7,503,042 B2* | 3/2009 | Henrickson et al. | 717/175 |
| 7,523,122 B2* | 4/2009 | Vasu | 707/101 |
| 7,685,593 B2* | 3/2010 | Solomon et al. | 717/170 |
| 8,255,899 B2* | 8/2012 | Halliday | 717/172 |
| 2002/0077919 A1 | 6/2002 | Lin et al. | |
| 2002/0091594 A1 | 7/2002 | Rosenberg et al. | |
| 2002/0133814 A1* | 9/2002 | Bourke-Dunphy et al. | 717/174 |
| 2003/0120708 A1* | 6/2003 | Pulsipher et al. | 709/106 |
| 2003/0188036 A1* | 10/2003 | Chen et al. | 709/310 |
| 2003/0212602 A1 | 11/2003 | Schaller | |
| 2004/0139001 A1 | 7/2004 | Henriques et al. | |
| 2004/0168169 A1* | 8/2004 | Ebro et al. | 717/172 |
| 2005/0086457 A1* | 4/2005 | Hohman | 713/1 |
| 2005/0102665 A1* | 5/2005 | Barta et al. | 717/174 |
| 2005/0102666 A1* | 5/2005 | Barta et al. | 717/174 |
| 2005/0102667 A1* | 5/2005 | Barta et al. | 717/174 |
| 2005/0120331 A1* | 6/2005 | Asare et al. | 717/104 |
| 2005/0261954 A1 | 11/2005 | Aoyama et al. | |
| 2007/0061443 A1* | 3/2007 | Chavda | 709/224 |
| 2007/0067764 A1* | 3/2007 | Byrd et al. | 717/168 |
| 2009/0300596 A1* | 12/2009 | Tyhurst et al. | 717/173 |

OTHER PUBLICATIONS

Ian Foster "Globus Toolkit Version 4: Software for Service-Oriented Systems", [Online], 2005, pp. 1-12, [Retrieved from Internet on Jul. 2, 2014], <http://toolkit.globus.org/alliance/events/sc05/GT4.pdf>.*

Kay Romer et al. "The Design Space of Wireless Sesnsor Networks", [Online], 2004, pp. 54-61, [Retrieved from Internet on Jul. 2, 2014], <http://mail.tku.edu.tw/inhon/702410209_R1.pdf>.*

Hasselbring, Wilhelm, et al; *The Dublo Architecture Pattern for Smooth Migration of Business Information Systems: An Experience Report*; ICSE 2004; IEEE, pp. 1-10.

Fraternali, Piero; *Tools and Approaches for Developing Data-Intensive Web Applications: A Survey*; ACM Computing Surveys, vol. 31, No. 3, Sep. 1999; pp. 227-263.

Pierce, Marlon, et al; *Interoperable Web Services for Computational Portals*; 2002 IEEE; pp. 1-12.

\* cited by examiner

MIGRATABLE UNIT BASED APPLICATION MIGRATION

BACKGROUND OF THE INVENTION

1. Field of the Invention

The present invention relates to the field of application distribution and more particular to the field of application migration.

2. Description of the Related Art

The application lifecycle includes the specification, development and deployment of computing applications into a target environment. An important phase of the application lifecycle includes application updates and modifications. Applying an update or modification, however, has proven difficult in practice. In this regard, applying an update or modification to an application often involves the replacement of important application components. Consequently, for most target environments, replacing an application component or components as part of applying an update or modification to the application involves the termination and shut down of the application prior to replacing one or more of the application components.

Application migration refers to the movement from one application or application version to another application or application version. Like applying updates and modifications to an existing application, migrating from one release of an application to the next can be an involved process as applications can include many different components which interrelate in many complex ways. Dependencies between components can further complicate the process of migration and the slightest disparity between application components can result in the improper operation of the application.

The common migration process focuses upon the aggregated system of components. Migration solutions for an aggregated system provide a set of predefined scenarios for users to follow in performing a migration. The predefined scenarios require all users performing the migration to understand the entire aggregated system, the predefined migration scenarios, and how each predefined scenario fits a unique situation. Moreover, the predefined migration scenarios can be very specific to a given aggregated system. In consequence, these migration solutions are viewed neither as reusable nor efficient to maintain, especially as the aggregated system becomes more and more complex.

The migration process generally requires that a subject application terminate at the outset of a migration. Enterprise applications can be mission critical for end users, however, such that an outage produced by a migration must be minimized. Similarly, application faults produced by an improperly executed migration too must be minimized for mission critical applications. To achieve both objectives, it is desirable to minimize the complexity of a migration to allow maximum understanding of the migration process among information technology professionals responsible for the migration.

BRIEF SUMMARY OF THE INVENTION

Embodiments of the present invention address deficiencies of the art in respect to application migration and provide a novel and non-obvious method, system and computer program product for application migration through migratable units. In one embodiment, an application migration method can include decomposing an application migration into a plurality of migratable units (MUs). The MUs can be prioritized for migration to a target platform. Thereafter, each of the MUs can be migrated in an order defined by the prioritization.

Prioritizing the MUs for migration to a target platform can include grouping sets of the MUs in different tiers, each tier corresponding to a different priority, each tier including MUs dependent upon MUs only in higher priority tiers. In particular, grouping sets of the MUs in different tiers further can include grouping MUs having a greater number of dependencies at higher priority tiers, and grouping MUs having a lower number of dependencies at lower priority tiers. Moreover, migrating each of the MUs in an order defined by the prioritization, can include migrating in parallel each of the MUs for each tier.

In another embodiment of the invention, an application migration data processing system can include a host computing platform and an MU based migration process coupled to the host computing platform. The MU based migration process can be configured to decompose an application migration into a plurality of MUs for prioritization and migration to a target platform in an order defined by the prioritization. Optionally, the order defined by the prioritization can include multiple tiers, each tier corresponding to a priority associated with maximum parallelization for migrating MUs in the tier.

As another option, the system can include a stateful wizard. The stateful wizard can include each of a hierarchical view of the MUs, a detail view for a selected one of the MUs, and a progress view of progress for the migration to the target platform. Specifically, the stateful wizard can guide users through a set of phases. These phases can include a "practice phase" that tests the migration in a way that does not affect the stability of the production system. In particular, the practice phase allows users to "test" the migration before performing the actual migration. Another phase is a "production migration phase" that actually migrates the production system. As a result, not only can the system be divided into logical units, but the project can be divided into a set of logical phases that address drawbacks of known solutions to the migration problem.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for application migration based upon MUs. In accordance with an embodiment of the present invention, an application migration can be configured to reduce complexity, minimize end user disruption and to mitigate migration risk. The application migration can include the decomposition of a migratory system into MUs. Sets of the MUs that can be applied in parallel can be determined and a priority of migration also can be determined for the sets. Sets of different priorities can be placed in different tiers of migration and the migration can be applied to a target application in order of the tiers, with different sets in the same tier executing in parallel.

In this way, at least a portion of the migration can execute in parallel thereby increasing the speed of migration and reducing downtime for the target application experienced by end users of the application. Moreover, the decomposition of a migration into MUs and the ordering of migration for the MUs reduces the complexity of migration for any single MU so as to require that information technologists only have a familiarity with the MUs under management. Reduction of complexity further can result in reduced risk of migration as only a discrete number of MUs can be under management for any one information technologist or team of information technologists.

The introduction of a "test phase" yet further can reduce the risk involved in the migration of a production system because the opportunity exists to perform a test migration of the production system that will not affect end users interacting with the production system. Likewise, problems that can arise during migration can be detected and addressed during the "test phase" before performing a migration on the production system. Finally, the complexity of migration further can be reduced through the operation of a stateful wizard providing a dashboard to the migration process.

Figure 1:
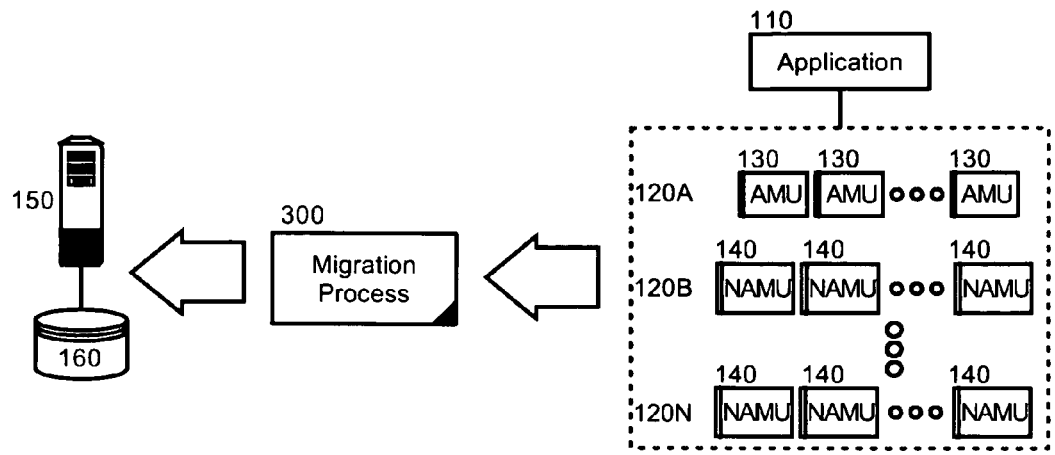
FIG. 1 is a pictorial illustration of a process for application migration based upon migratable units.

In further illustration of an inventive embodiment, FIG. 1 is a pictorial illustration of a process for application migration based upon MUs. As shown in FIG. 1, an application 110 intended for migration into a target platform 150 and data store 160 can be decomposed into multiple sets of MUs, including both autonomous MUs (AMUs) 130, and non-autonomous MUs (NAMUs) 140. Generally, an MU is a portion of the application 110 that can be migrated to the target platform 150 and data store 160 through a series of migratory steps that do not interact with other MUs. An AMU 130 is an MU that does not depend upon the state of any other MU. In contrast, a NAMU 140 is an MU that depends upon the state of at least one other MU.

Notably, the MUs of the application 110 can be prioritized for migration within a selection of tiers 120A, 120B, 120n. MUs having the same priority of migration can be grouped in a single one of the tiers 120A, 120B, 120n. Preferably, MUs that have a dependency on the fewest number of other MUs are placed at a higher priority tier among the selection of tiers 120A, 120B, 120n. These MUs are easily migratable due to lower dependency and should be migrated first. Accordingly, the highest priority tier 120A can include AMUs 130 which do not depend upon other MUs, while NAMUs 140 can be found in the other lower priority tiers 120B, 120N. Notably, NAMUs 140 which depend upon the migration status of other MUs logically are grouped in tiers 120n which are lower in priority than tiers 120A, 120B in which those MUs are grouped. In this way, the risk of migration can be reduced as dependency relationships are considered in establishing the grouping of MUs in tiers 120A, 120B, 120n.

Figure 2:
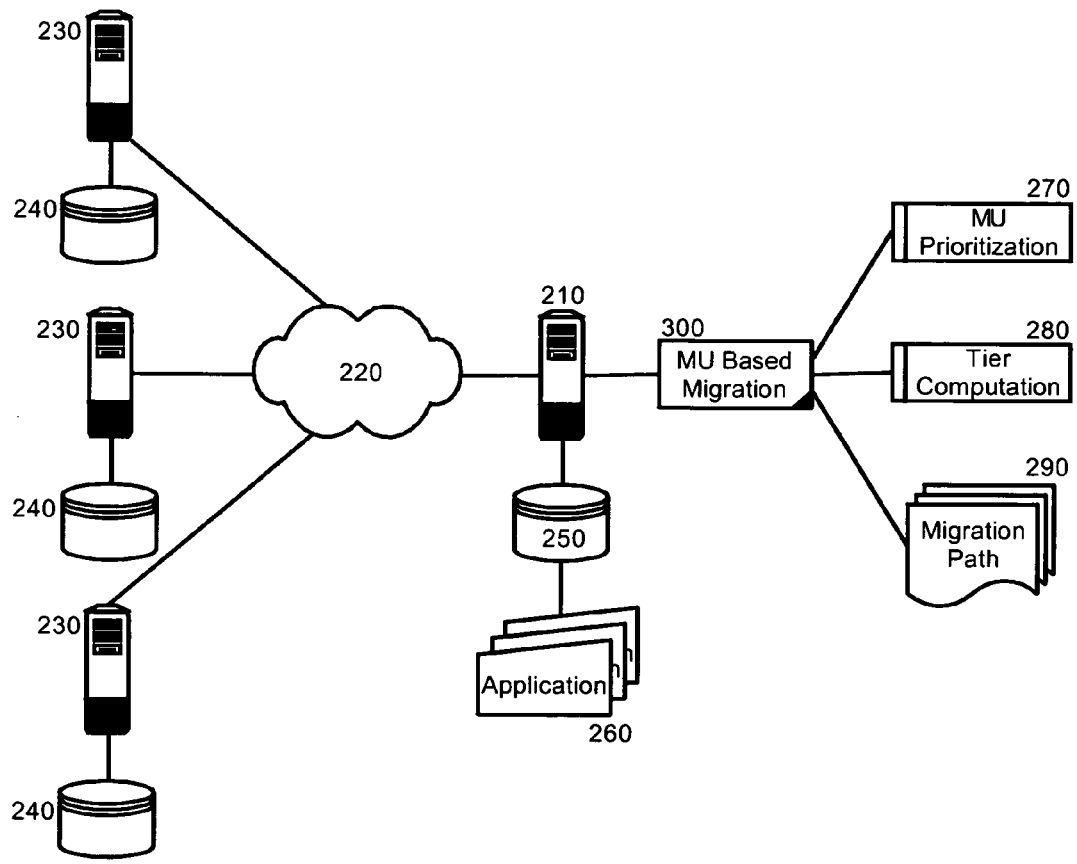
FIG. 2 is a schematic illustration of an application migration data processing system configured for application migration through migratable units.

In operation, a migration logic 300 can perform the decomposition of the application 110 for migration into one or more AMUs 130 and one or more NAMUs 140, and the AMUs 130 and NAMUs 140 can be grouped into selected ones of the tiers 120A, 120B, 120n. Additionally, within any one of the tiers 120A, 120B, 120n, the MUs can be ordered for migration onto the target platform 150 and data store 160 according to those MUs that can be migrated in parallel and those MUs which must be migrated serially. In order to minimize downtime for the target platform 150 and data store 160, those MUs able to be migrated in parallel are prioritized for migration first. As a second criterion, those MUs that other MUs have the most dependencies upon among other MUs in other tiers 120B, 120n can be migrated first so as to minimize risk The migration process 300 can be disposed within a data processing system enabled for application migration. In further illustration, FIG. 2 depicts an application migration data processing system configured for application migration through migratable units. As shown in FIG. 2, an application migration data processing system 210 can be communicatively coupled to one or more target computing platforms 230 and one or more target data stores 240 over a computer communications network 220. The application migration data processing system 210 can include data storage 250 configured to store one or more applications 260 designated for migration to one or more of the target computing platforms 230 and target data stores 240.

The application migration data processing system 210 can be coupled to MU-based migration logic 300. The MU-based migration logic 300 can include program code enabled to perform each of MU prioritization 270, tier computation 280 and migration path selection 290. The MU prioritization 270 can include determining an ordering of MUs in a tier in order to maximize parallelism of migration of MUs at one time in order to minimize the time required to migrate the application 260. To the extent that computing resources cannot accommodate the parallel migration of selected MUs, the MU prioritization 270 further can prioritize those MUs which have the greatest number of dependencies in lower priority tiers in order to maximize the number of MUs able to be migrated subsequently.

The tier computation 280 can include the grouping of MUs able to migrated in parallel. The first tier can include all AMUs which are dependent upon no other MU by definition. Subsequent tiers can include NAMUs such that every NAMU in a tier depends only upon MUs in higher priority tiers. Accordingly, NAMUs in lower priority tiers can depend only on MUs in higher priority tiers and there are no MUs which depend upon the MUs in the lowest priority tier.

Finally, the migration path 290 can reflect a migration behavior that can change based upon the context of the environment for migration. A selected migration path 290 can reflect the selected migration behavior for all MUs in the migration. As such, a migration phase can include the execution of a selected migration path 290. Importantly, a "test phase" can include the migration behavior associated with performing the migration of MUs into a test computing platform utilizing a second data store without effect on a corresponding production data store. Conversely, a "production phase" can include the migration behavior of the same MUs in the migration to the actual production platform utilizing the production store. In this way, the opportunity exists to perform a test migration of the production system that will not affect end users interacting with the production system. Likewise, problems that can arise during migration can be detected and addressed during the "test phase" before performing a migration on the production system.

Figure 3:
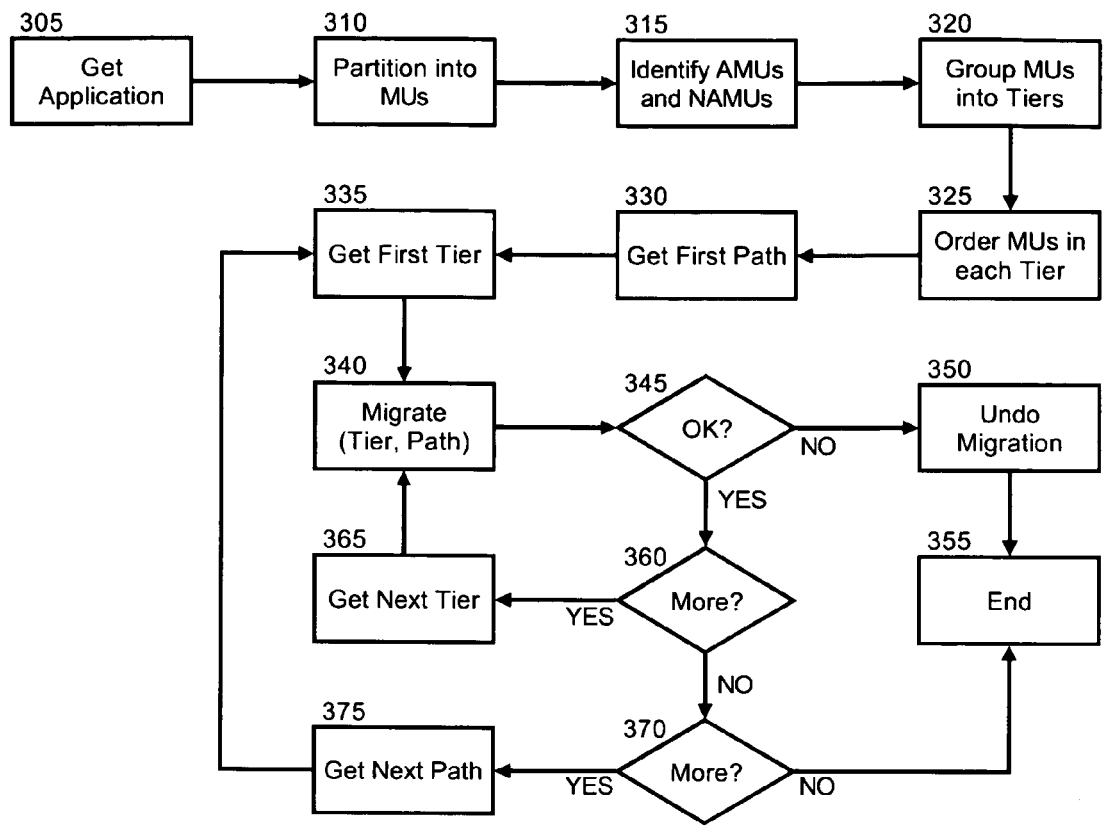
FIG. 3 is a flow chart illustrating a process for application migration through migratable units.

In yet further illustration of the operation of the MU-based migration logic 300, FIG. 3 is a flow chart illustrating a process for application migration through migratable units. Beginning in block 305, an application can be retrieved for migration and in block 310, the application can be decomposed into MUs. In block 315, AMUs and NAMUs can be identified for the MUs and block 320, the MUs can be grouped into tiers to maximize parallelism. In block 325, the MUs can be ordered within each tier and in block 330, a first path for a migration behavior can be selected for processing. Thus, each path for migration includes MUs listed in order of the tiers where MUs within each tier may also be optionally ordered. If there are multiple migration behaviors for an MU then one migration behavior must be specified.

In block 335, a first tier of the MUs can be selected and in block 340, the MUs in the tier can be migrated according to the migration behavior of the path. In decision block 345, if the migration did not succeed for the tier, in block 350 the migration can be un-done and the process can end in block 355. Otherwise, in decision block 360, if additional tiers remain to be processed, in block 365 a next tier can be selected and the next selected tier can be migrated according to the migration behavior of the path. This process can repeat for the remaining tiers of MUs. When no tiers are determined to remain in decision block 360, it can be determined whether additional paths remain to be processed. If so, in block 375 the next path can be selected and the process can repeat through block 335. Otherwise, the process can end in block 355.

Notably, it will be recognized by the skilled artisan that the migration process can span a substantial period of time—perhaps days. To address the complexity of the migration process over such an extended period of time, a stateful wizard can be provided. The stateful wizard can guide an end user through the migration process which can be divided into multiple migration tasks. The wizard can be restarted at the migration task following the previously completed migration task. In addition, the state of the stateful wizard can be reset to the initial starting state, or users can revisit any previously completed migration task.

To implement the foregoing, a state machine can record the state of each of the migration tasks. Every migration task can be treated as a node in a state tree with a set of predefined states to indicate the result of its execution. To provide a visual cue as to the state of the migration, each migration task further can be represented by a user interface artifact. Also, to support the navigation of the different migration tasks, a routing table can be used to determine the navigation flow between the migration tasks. The routing table also can define rules to navigate between the migration tasks. Finally, the states of task execution can be persisted by the stateful wizard. Consequently, if the stateful wizard is stopped and then restarted, the stateful wizard can return to the next migration task to be executed.

Figure 4:
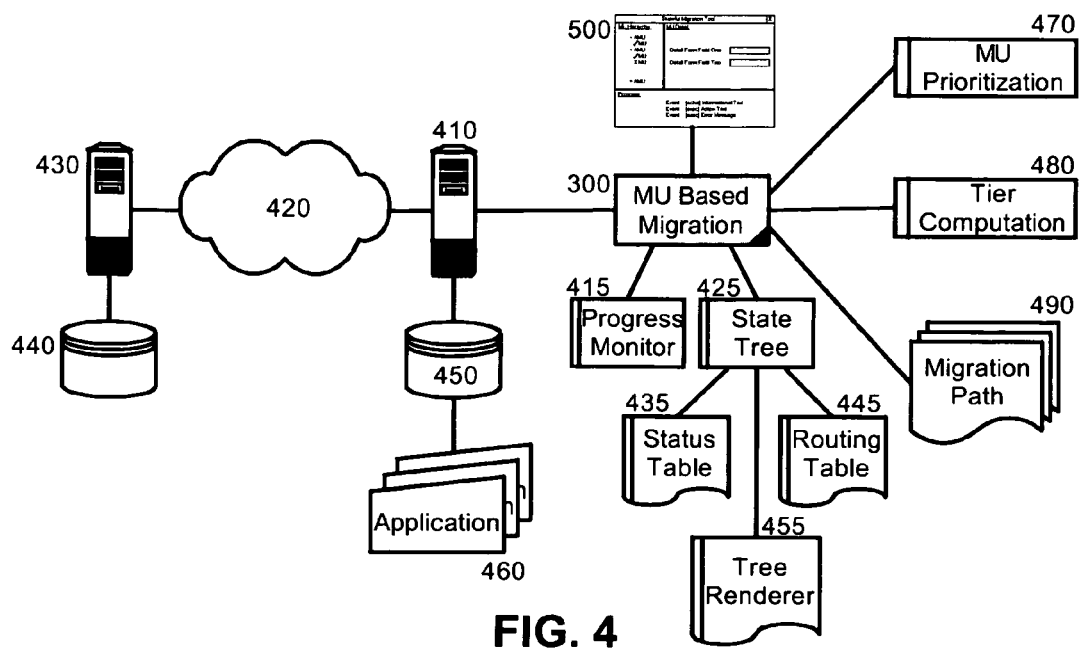
FIG. 4 is a schematic illustration of an application migration data processing system configured for application migration through migratable units utilizing a stateful wizard.

The use of the stateful wizard can reduce the skill requirement of individuals in a migration project. Specifically, users can perform migration tasks with a lower dependency on documentation as the stateful wizard can guide users through the migration process step-by-step. In further illustration, FIG. 4 is a schematic illustration of an application migration data processing system configured for application migration through migratable units utilizing a stateful wizard. As shown in FIG. 4, in an embodiment incorporating a stateful wizard, an application migration data processing system 410 can be communicatively coupled to one or more target computing platforms 430 and one or more target data stores 440 over a computer communications network 220.

The application migration data processing system 410 can include data storage 450 configured to store one or more applications 460 designated for migration to one or more of the target computing platforms 430 and target data stores 440. The application migration data processing system 410 can be coupled to MU-based migration logic 300. As before, the MU-based migration logic 300 can include program code enabled to perform each of MU prioritization 470, tier computation 480 and migration path selection 490. Importantly, the MU-based migration logic 300 further can be coupled to a stateful wizard 500. The stateful wizard 500 can include each of a progress monitor 415 and a state tree 425.

The progress monitor 415 can track the progress of a migration over an extended period of time in terms of which MUs have been migrated in which tiers for which paths, and so forth. The state tree 425 can include each of a status table 435, a routing table 445 and a tree renderer 455. The status table 435 can map each node in the state tree 425 to a corresponding pre-defined state, including "success", "failure" and "unknown". The routing table 445, in turn, can define the routes and navigation rules between tasks. Finally, the routing table 445 can provide guidance to the tree renderer 455 on how to display the navigation tree. In this regard, the tree renderer 455 can provide a visual representation of the routes and the state of each task. Moreover, the tree renderer 455 can monitor and reflect the changes of the status table.

Figure 5:
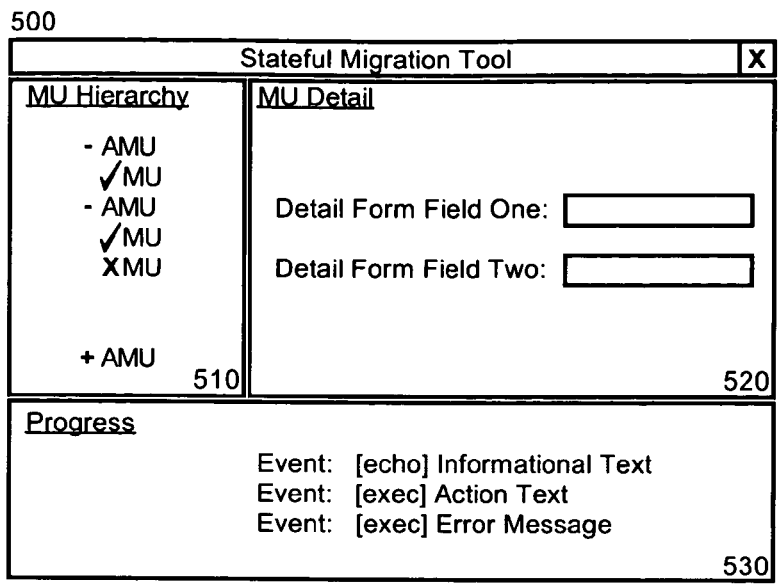
FIG. 5 is a screen shot of a stateful wizard of FIG. 4.

In yet further illustration, FIG. 5 is a screen shot of the stateful wizard 500 of FIG. 4. As shown in FIG. 5, the stateful wizard 500 can include a hierarchical view 510 of migration tasks corresponding to MUs organized by tier. The stateful wizard 500 further can include a detail view 520 of a selected migration task in the hierarchical view 510. The detail view 520 can permit user input to be provided for a migration task including configuration of the migration task. Finally, the stateful wizard 500 can include a progress view 530. The progress view 530 can show a line-by-line representation of the migration process.

Figure 6:
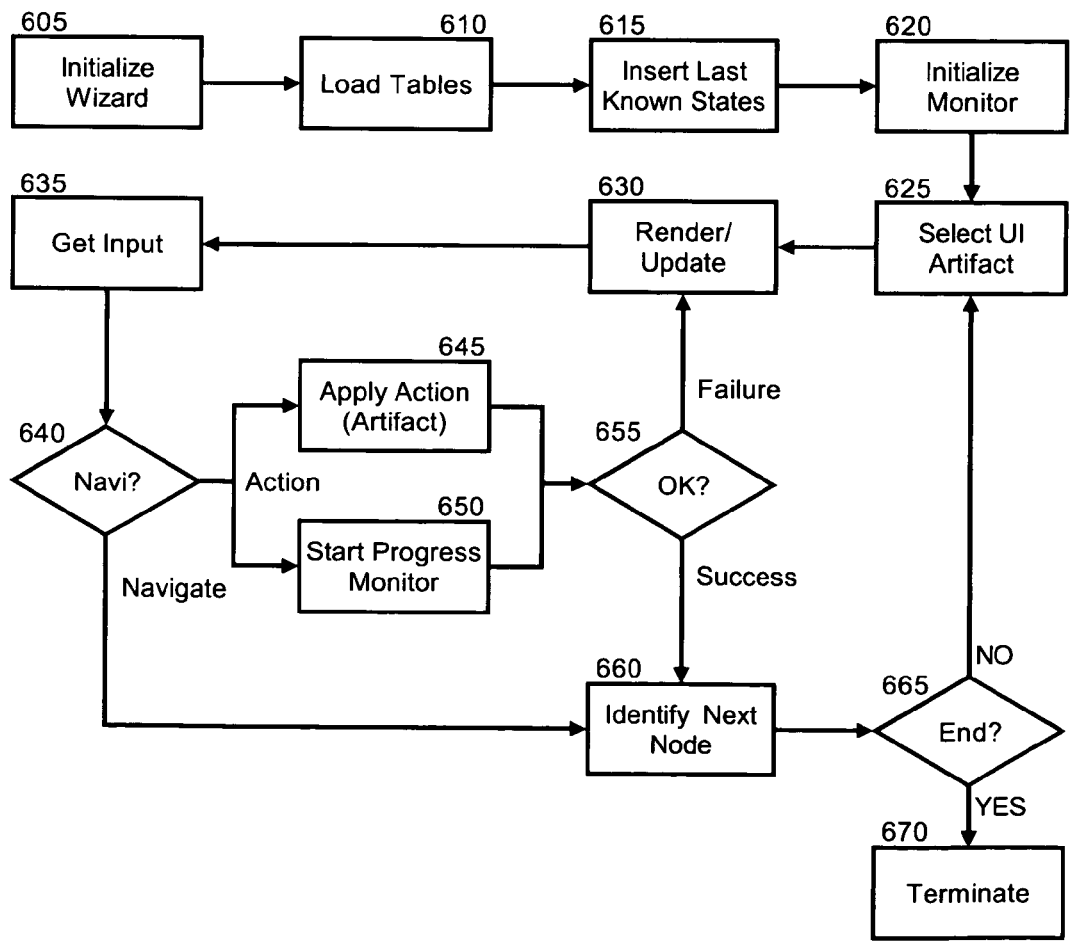
FIG. 6 is a flow chart illustrating a process for managing a stateful wizard in the data processing system of FIG. 4.

In even yet further illustration, FIG. 6 is a flow chart illustrating a process for managing a stateful wizard for a migration process in the data processing system of FIG. 4. Beginning in block 605, the stateful wizard can be initialized and in block 610, the state table and routing table can be loaded for processing. In block 615, the last known states for the migration process and in block 620, the progress monitor can be initialized for the migration process. Subsequently, the process can continue through block 625.

In block 625, a first user interface artifact can be selected for a last known state of the migration process. In block 630, the hierarchy for the migration process can be rendered showing the current state for each node in the hierarchy. Subsequently, in block 635, input can be received for the selected user interface artifact. In decision block 640, if it is determined that the input is a navigation directive, in block 660, navigation rules specified by the routing table can be consulted along with the navigation directive in order to determine a next node in the hierarchy. Based upon the identified next node in the hierarchy, it can be determined in decision block 665 whether additional migration tasks remain. If so, in block 625 a user interface artifact for a next node can be selected and the process can repeat through block 630. Otherwise, the process can terminate in block 670.

In decision block 640, if it is determined that the input is not a navigation command, the input is presumed to be an action for the selected node. As such, in block 645, the action for the artifact can be applied, and concurrently, in block 650, the progress monitor can be started. In this regard, the progress monitor can be a listener for events in the migration. Accordingly, the progress monitor can continually execute looking for events. In either case, in decision block 655, if an event is detected and is determined to indicate a failure condition, processing moves to block 630 to update the view. In contrast, in decision block 655, if an event is detected and is determined to indicate a success condition, in block 660 a next node can be identified and in block 665 it can further be determined whether additional migration tasks remain. If so, in block 625 a user interface artifact for a next node can be selected and the process can repeat through block 630. Otherwise, the process can terminate in block 670.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer implemented application migration method comprising:
    decomposing an application migration into a plurality of migratable units (MUs);
    prioritizing the MUs for migration to a target platform;
    displaying a stateful wizard; and
    migrating each of the MUs in an order defined by the prioritization, wherein
    state stateful wizard includes
    a hierarchical view of migration tasks corresponding to the MUs,
    a detail view of a selected migration task in the hierarchical view, and
    a progress view showing a representation of the application migration.

2. The method of claim 1, wherein prioritizing the MUs for migration to the target platform, comprises:
    identifying autonomous migratable units (AMUs) and non-autonomous migratable units (NAMUs) among the plurality of MUs; and,
    prioritizing the AMUs over the NAMUs for migration to the target platform.

3. The method of claim 1, wherein prioritizing the MUs for migration to the target platform, comprises grouping sets of the MUs in different tiers, each tier corresponding to a different priority level, each tier comprising MUs dependent upon MUs only in higher priority tiers.

4. The method of claim 2, wherein prioritizing the MUs for migration to the target platform, comprises:
    grouping all AMUs in a highest priority tier; and,
    grouping sets of the NAMUs in different lower priority tiers, each lower priority tier corresponding to a different priority, each lower priority tier comprising NAMUs dependent upon MUs only in higher priority tiers.

5. The method of claim 3, wherein grouping sets of the MUs in different tiers, further comprises:
    grouping MUs having a greater number of dependencies at higher priority tiers; and,
    grouping MUs having a lower number of dependencies at lower priority tiers.

6. The method of claim 3, wherein migrating each of the MUs in an order defined by the prioritization, comprises migrating in parallel each of the MUs for each tier.

7. The method of claim 1, further comprising:
    defining a plurality of migration phases, each for a different migration behavior of the MUs; and,
    performing a migration of the MUs for each of the migration phases.

8. The method of claim 1, further comprising managing the migration to the target platform through a stateful wizard.

9. An application migration data processing system comprising:
    a host computing platform comprising a processor and a memory; and,
    a migratable unit based migration processing logic coupled to the host computing platform and configured to
    decompose an application migration into a plurality of migratable units (MUs) for prioritization and migration to a target platform in an order defined by the prioritization, and
    generate a state stateful wizard including
    a hierarchical view of migration tasks corresponding to the MUs,
    a detail view of a selected migration task in the hierarchical view, and
    a progress view showing a representation of the application migration.

10. The system of claim 9, wherein the MUs comprise autonomous migratable units (AMUs) and non-autonomous migratable units (NAMUs).

11. The system of claim 9, wherein the order defined by the prioritization comprises a plurality of tiers, each tier corresponding to a priority associated with maximum parallelization for migrating MUs in the tier.

12. The system of claim 9, further comprising a stateful wizard, the stateful wizard comprising each of a hierarchical view of the MUs, a detail view for a selected one of the MUs, and a progress view of progress for the migration to the target platform.

13. A computer program product comprising a computer usable storage memory embodying computer usable program code for application migration, said computer program product including computer usable program code, which when executed by a computer hardware system, causing the computer hardware system to perform the operations of
    decomposing an application migration into a plurality of migratable units (MUs);
    prioritizing the MUs for migration to a target platform;
    displaying a stateful wizard; and
    migrating each of the MUs in an order defined by the prioritization, wherein
    state stateful wizard includes
    a hierarchical view of migration tasks corresponding to the MUs,
    a detail view of a selected migration task in the hierarchical view, and
    a progress view showing a representation of the application migration.

14. The computer program product of claim 13, wherein the prioritizing the MUs for migration comprises:
    identifying autonomous migratable units (AMUs) and non-autonomous migratable units (NAMUs) among the MUs; and
    prioritizing the AMUs over the NAMUs for migration to the target platform.

15. The computer program product of claim 13, wherein the prioritizing the MUs for migration, comprises grouping sets of the MUs in different tiers, each tier corresponding to a different priority, each tier comprising MUs dependent upon MUs only in higher priority tiers.

16. The computer program product of claim 14, wherein the prioritizing the MUs for migration, comprises:
    grouping all AMUs in a highest priority tier; and,
    grouping sets of the NAMUs in different lower priority tiers, each lower priority tier corresponding to a different priority, each lower priority tier comprising NAMUs dependent upon MUs only in higher priority tiers.

17. The computer program product of claim 15, wherein the grouping sets of the MUs, further comprises:
    grouping MUs having a greater number of dependencies at higher priority tiers; and
    grouping MUs having a lower number of dependencies at lower priority tiers.

18. The computer program product of claim 15, wherein each of the MUs for each tier are migrated in parallel.

19. The computer program product of claim 13, further comprising:
    defining a plurality of migration phases, each for a different migration behavior of the MUs; and
    performing a migration of the MUs for each of the migration phases.

20. The computer program product of claim 13, further comprising
    managing the migration to the target platform through a stateful wizard.

* * * * *